US005665811A

United States Patent [19]

Takeda et al.

[11] Patent Number: 5,665,811

[45] Date of Patent: Sep. 9, 1997

[54] ALKENYLSUCCINIC ACID EMULSION SIZING AGENT (2)

[75] Inventors: Yasusuke Takeda; Sadao Kotsuka; Takeshi Kouchi, all of Kanagawa, Japan

[73] Assignee: Mitsubishi Oil Co., Ltd., Tokyo, Japan

[21] Appl. No.: 542,876

[22] Filed: Oct. 13, 1995

[30] Foreign Application Priority Data

Oct. 14, 1994 [JP] Japan .................................... 6-274325

[51] Int. Cl.$^6$ .............................. C08K 5/09; D21H 17/16

[52] U.S. Cl. .......................... 524/487; 524/271; 524/272; 524/275; 524/112; 524/549; 252/315.4

[58] Field of Search .................................... 524/487–489, 524/271, 272, 275, 112, 549, 270; 252/315.4

[56] References Cited

U.S. PATENT DOCUMENTS 4,129,507 12/1978 Marshall et al. ......................... 252/8.9
5,219,912 6/1993 Takahashi et al. ...................... 524/321
5,306,757 4/1994 Hatanaka et al. ....................... 524/321
5,391,225 2/1995 Shigeto et al. .......................... 524/112

FOREIGN PATENT DOCUMENTS 0 216 297 4/1987 European Pat. Off. .
0 468 280 1/1992 European Pat. Off. .

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

An alkenylsuccinic acid emulsion sizing agent having a solid concentration of at least 30% by weight, which comprises an active component comprising:

(1) from 70 to 95 parts by weight of an alkenylsuccinic acid obtained by reacting a branched internal olefin having 12 to 18 carbon atoms with maleic anhydride; and (2) from 5 to 30 parts by weight of an oxidized wax; and wherein the active component is dispersed in water using a high-molecular weight dispersion stabilizer or a mixed system of a high-molecular weight dispersion stabilizer with an emulsifier.

2 Claims, No Drawings

ALKENYLSUCCINIC ACID EMULSION SIZING AGENT (2)

FIELD OF THE INVENTION

This invention relates to a novel alkenylsuccinic acid-series emulsion sizing agent having a high storage stability at a high concentration which exerts an excellent sizing effect on paper under papermaking conditions over a wide pH range.

BACKGROUND OF THE INVENTION

Saponified (solution type) rosin sizing agents have been used for internal addition in a process for manufacturing paper under acidic conditions together with the use of aluminum sulfate. However, such a sizing agent exerts a poor sizing effect at a low addition level. Moreover, the sizing effect is further reduced due to an increase in water temperature accompanying the recent closed drainage system or within a range around neutral pH. In order to overcome the above-mentioned disadvantages of the saponified rosin sizing agents, emulsion type rosin sizing agents have been developed. Under the present conditions, however, these emulsion type robin sizing agents are also unsatisfactory because of the poor sizing effects at a low addition level or within a range around neutral pH.

In order to compensate for the disadvantage of these rosin-series sizing agents, saponified alkenylsuccinic acids have recently been used. These are obtained by saponifying alkenylsuccinic acids with alkalis, as a sizing agent exhibiting an excellent sizing effect at a low addition level (JP-A-58-214598), (The term "JP-A" as used herein means an "unexamined published Japanese patent application"). However, with these sizing agents the sizing effects thereof are deteriorated in papermaking at a high temperature or within a range around neutral pH, similar to the saponified rosin sizing agents.

A method wherein an alkenylsuccinic anhydride blended with an emulsifier is emulsified with a solution of cationic starch or water at a low concentration (about 0.5 to 3%) and used for neutral papermaking (U.S. Pat. No. 3,821,069) is known.

The reaction responsible for alkenylsuccinic anhydride sizing is as follows. Sizing is achieved by the anhydride group in the alkenylsuccinic anhydride molecule esterifying a fiber hydroxyl group of cellulose, i.e., the main component of pulp, and thus, introducing the substituent hydrophobic alkenyl group onto the fiber surface. Because of the higher reactivity of alkenylsuccinic anhydride, it is known to form an ester bond with the hydroxyl group of cellulose. However, the alkenylsuccinic anhydride is highly reactive with water too. When the alkenylsuccinic anhydride is preliminarily emulsified and dispersed in water, therefore, it reacts with water within a short period of time. As a result, an acid anhydride group is converted into a carboxyl group, which causes a loss in function as a neutral sizing agent. During the process of the conversion of the acid anhydride group into the carboxyl group due to the reaction with water, the emulsion system is changed displaying aggregation, precipitation and separation. Therefore, an emulsion sizing agent comprising an alkenylsuccinic anhydride for neutral papermaking, in the form of an aqueous dispersion can be stored for only several hours. Accordingly, it cannot be supplied in the form of an emulsion product with a high concentration. This characteristic requires that it be emulsified and dispersed by using an emulsifier immediately before the papermaking.

It is also known that an alkenylsuccinic anhydride shows a lower esterification reactivity of he acid anhydride group under acidic conditions than under neutral or weakly alkaline conditions. When an emulsion of an alkenylsuccinic anhydride is used under acidic papermaking conditions (in particular, at a pH value of 5.0 or below), the sizing effect appears slowly, and only a poor sizing effect can be achieved immediately after the papermaking. If an alkenylsuccinic anhydride could be hydrolyzed into the corresponding alkenylsuccinic acid and then emulsified, the above-mentioned problem of changes (i.e., aggregation, precipitation, separation) in the emulsion system might be solved, and the alkenylsuccinic acid would rapidly react with aluminum sulfate even in an acidic region to thereby exert an excellent sizing effect immediately after the papermaking. However an alkenylsuccinic acid can hardly be emulsified due to its highly hydrophilic nature. It is therefore difficult to obtain an emulsion which has a higher concentration than the conventional emulsion type rosin sizing agents and which can remain stable over a long period.

It has been known to use a wax as a water repellent agent. In sizing agents for papermaking, emulsions of paraffin wax and montan wax have been used to increase water repellency and decrease cost. In recent years, emulsion sizing agents wherein an alkenylsuccinic acid is blended with paraffin wax or maleic wax (JP-A-62-70479) have been proposed. However these sizing agents are disadvantageous in that the storage stabilities and sizing effects of the same are limited or a large amount of an emulsifier is required.

SUMMARY OF THE INVENTION

An object of the present invention is to provide a novel alkenylsuccinic acid emulsion sizing agent which exerts an excellent sizing effect at a high temperature and over a wide pH range immediately after the papermaking, even though it is added at a low addition level and, which has a high storage stability at a high concentration.

Extensive studies have been conducted in order to solve the above-mentioned problems. As a result, they have successfully found out that an emulsion sizing agent having a high storage stability at a high concentration can be produced by blending 5 to 30% of a wax, having a high softening point (around 80° C. or more determined by JIS K 2207) and an acid value of from 10 to 40 (mgKOH/g), with an alkenylsuccinic acid employed as a material for a sizing agent, and emulsifying the mixture thus obtained with the use of a high-molecular weight dispersion stabilizer at a high temperature (i.e., more than 100° C.) under a high pressure (i.e., more than 10 kg/cm2). This emulsion exhibits an outstanding sizing effect which cannot be achieved by the conventional saponified or emulsion sizing agents, even in a papermaking process at a low addition level, at a high temperature and over a wide pH range.

Accordingly, the present invention relates to an alkenylsuccinic acid-series emulsion sizing agent having a solid concentration of at least 30% by weight, which comprises an active component comprising (1) from 70 to 95 parts by weight of an alkenylsuccinic acid obtained by reacting a branched internal olefin having 12 to 18 carbon atoms with maleic anhydride and (2) from 5 to 30 parts by weight of an oxidized wax. The active component is dispersed in water using a high-molecular weight dispersion stabilizer or a mixed system of a high-molecular weight dispersion stabilizer with an emulsifier.

In the present invention, an oxidized wax having a high softening point is blended with an alkenylsuccinic acid.

Thus, an emulsion of alkenylsuccinic acid having a fine texture and a high stability can be obtained by an emulsification method with the use of a high-temperature high-pressure emulsifier. High temperature and high pressure emulsifiers known in the art such as an emulsifier composed of a high-pressure homogenizer provided with a circulation circuit (JP-B-06-55824, the term "JP-B" as used herein means an "examined Japanese patent publication") may be used.

DETAILED DESCRIPTION OF THE INVENTION

The alkenylsuccinic acid to be used in the present invention can be those produced by reacting an alkenylsuccinic anhydride with an equimolar amount of water. Alkenylsuccinic anhydrides prepared by an addition reaction between an olefin and maleic anhydride as is known in the art may be used (for example, as described in JP-B-04-37199). As the olefin, it is preferable to use branched internal olefin having from 12 to 18 carbon atoms.

Regarding the mixing ratio of the alkenylsuccinic acid to the oxidized wax, i.e., the main components of the sizing agent of the present invention, from 60 to 95 parts by weight of the alkenylsuccinic acid is mixed with from 5 to 40 parts by weight of the oxidized wax. It is preferable to mix from 70 to 85 parts by weight of the alkenylsuccinic acid with from 15 to 30 parts by weight of the oxidized wax. The oxidized wax used in the present invention is one having a softening point of 100° C. or above and an acid value of from 10 to 40 (mgKOH/g). It is most preferable to use an oxidized wax having a softening point of from 100° to 120° C. and an acid value of from 10 to 25 (mgKOH/g). It is not desirable for the content of the oxidized wax to exceed 40 parts by weight, since the sizing agent activity is decreased at that point.

As the high-molecular weight dispersion stabilizer employed for the emulsification in the present invention, anionic substances comprising a partial or complete saponification product (i.e., 60 to 100% saponification) of a copolymer comprising from 5 to 95 parts by weight of component (A) which is a monomer constituting a hydrophilic group and from 5 to 95 parts by weight of component (B) which is a monomer constituting a hydrophobic group may be used. As the component (A), acrylic acid, methacrylic acid, maleic acid, maleic anhydride, itaconic acid and fumaric acid may be used, while as the component (B), styrene-series monomers (for example, styrene, α-methylstyrene) and acrylates and methacrylates (for example, methyl acrylate, methyl methacrylate, ethyl acrylate, ethyl methacrylate, butyl acrylate, butyl methacrylate) may be used.

It is also possible to use other emulsifiers together with the ones described above. Examples of the emulsifiers include anionic surfactants such as alkylbenzenesulfonic acid salts, polyoxyethylene alkyl ether sulfate salts, polyoxyethylene alkyl phenyl ether sulfate salts, polyoxyethylene aralkyl phenyl ether sulfate salts, alkyl ether sulfate salts, polyoxyethylene alkyl ether phosphates and salts thereof, polyoxyethylene alkyl phenyl ether phosphates and salts thereof and polyoxyethylene aralkyl phenyl ether phosphates and salts thereof. Examples of emulsifiers also include nonionic surfactants such as polyoxyethylene alkyl ethers, polyoxyethylene alkyl phenyl ethers, polyoxyethylene aralkyl phenyl ethers, sorbitan fatty acid esters and polyoxyethylene sorbitan fatty acid esters.

In the present invention, it is possible to blend a hydrocarbon resin free from any acid group with the alkenylsuccinic acid to thereby improve the emulsification properties and the stability of the emulsion. Examples of the hydrocarbon resin which may be used include aromatic methylene resins, aromatic formaldehyde resins having an aromatic ring bound via methylene, ether, acetal or methylol group and oligomers of 1,3-pentadiene. Such a hydrocarbon resin free from acid groups is blended in an amount of from 5 to 30 parts by weight per 70 to 95 parts by weight of the alkenylsuccinic acid with the oxidized wax. Preferably, it is blended in amount of from 5 to 20 parts by weight of the hydrocarbon resin free from any acid group per 80 to 95 parts by weight of the alkenylsuccinic acid with the oxidized wax.

The sizing agent according to the present invention can be added to a material for paper-manufacturing at an arbitrary point prior to the completion of the papermaking process, in a similar manner to the conventional rosin-series sizing agents. For example, aluminum sulfate may be added before or after adding the sizing agent of the present invention to a pulp slurry during or after the beating step to thereby regulate the slurry to a pH of from 4.0 to 7.0 for the fixation of the sizing agent to the pulp. It is also possible to use the sizing agent of the present invention together with another sizing agent (for example, conventional rosin-series sizing agent, and petroleum resin sizing agent) at an arbitrary ratio.

In the case of the internal-addition sizing, the sizing agent of the present invention is used (added) at a ratio of from 0.01 to 5.0% by weight, preferably from 0.05 to 3.0% by weight, based on the weight of dry pulp.

EXAMPLES

The following Examples will be given to further illustrate the present invention in greater detail, and not intended to be limiting. Unless otherwise indicated, all parts, percents, ratios and the like are by weight.

Preparation of High-molecular Weight Dispersion Stabilizer

Referential Example 1

Into a 1 l glass flask were fed 60 g of acrylic acid, 10 g of stearyl methacrylate, 30 g of butyl acrylate, 0.1 g of 2-mercaptoethanol, 566 g of water and 5 g of a commercially available sulfate-series surfactant (Hitenol™ NF-13, manufactured by Dai-ichi Kogyo Seiyaku, Co., Ltd.) The mixture was heated to 70° C. under stirring. Then 50 g of ammonium peroxodisulfate was slowly dropped into this mixture. After the completion of the addition, the reaction mixture was allowed to react at 80° C. for 2 hours and cooled to thereby give an acrylic acid-series copolymer in a milky white color.

Referential Example 2

To completely saponify the carboxyl group moiety originating in acrylic acid of the acrylic acid-series copolymer obtained in the above Referential Example 1, 167 g of a 20% aqueous solution of sodium hydroxide was added thereto, and the mixture was stirred at 40° C. for 1 hour. Thus, a saponified product of the acrylic acid-series copolymer was obtained. This high-molecular weight dispersion stabilizer was in the form of a viscous liquid in a pale pink color which contained 15% by weight of solid matters and had a viscosity of 8,000 cps.

Referential Example 3

60% of the acid group moiety of the acrylic acid-series copolymer obtained by the above Referential Example 1 was partly saponified by the same method as the one of Referential Example 2 to thereby give a high-molecular weight dispersion stabilizer having a milky white color which contained 14% by weight of solids and had a viscosity of 12,000 cps.

Example 1

A propylene oligomer (having an average of 15 carbon atoms) was subjected to an addition reaction with maleic anhydride to thereby give an alkenylsuccinic anhydride. This compound was then reacted with an equimolar amount of water to thereby prepare an alkenylsuccinic acid. To 306 g of this alkenylsuccinic acid was added 54 g of an oxidized wax (Polylets OX-13™, manufactured by Chusei Wax Polymer K.K.). After mixing at 120° C., the mixture was fed into a high-temperature high-pressure emulsifier and circulated. Subsequently, a solution of 75 g of the high-molecular weight dispersion stabilizer prepared in Referential Example 2 in 596 g of water was sprayed into the mixture under a nozzle pressure of 18 kg/cm$^2$ over 15 minutes and the mixture was subjected to reversal emulsification while maintaining the temperature in the system to 120° to 130° C. After circulating for an additional 5 minutes, the mixture was cooled by allowing it to stand. Thus an oil-in-water type emulsion having a total solid concentration of 35% by weight was prepared.

Example 2

288 g of an alkenylsuccinic acid, which had been prepared from a propylene oligomer (having an average of 15 carbon atoms) by the same method as the one of Example 1, 54 g of an oxidized wax (Polylets OX-18™, manufactured by Chusei Wax Polymer K.K.) and 18 g of a 1,3-pentadiene oligomer (Maruka Clear R-oil, manufactured by Maruzen Oil Chemistry Co., Ltd.) were heated to 120° C. and mixed together. Then the mixture was fed into a high-temperature high-pressure emulsifier and circulated. Subsequently, a solution of 75 g of the high-molecular weight dispersion stabilizer prepared in Referential Example 2 in 596 g of water was added in the same manner as the one described in Example 1. After reversal emulsification, an oil-in-water type emulsion having a total solid concentration of 35% by weight was prepared.

Example 3

288 g of an alkenylsuccinic acid, which had been prepared from a propylene oligomer (having an average of 15 carbon atoms) by the same method as the one of Example 1, 54 g of an oxidized wax (Polylets OX-24™, manufactured by Chusei Wax Polymer K.K.) and 18 g of a 1,3-pentadiene oligomer (Maruka Clear R-oil, manufactured by Maruzen Oil Chemistry Co., Ltd.) were heated to 120° C. and mixed together. Then the mixture was fed into a high-temperature high-pressure emulsifier and circulated. Subsequently, a solution of 75 g of the high-molecular weight dispersion stabilizer prepared in Referential Example 2 and 3.6 g of a commercially available sulfate-series surfactant (Hitenol NF-18™, manufactured by Dai-ichi Kogyo Seiyaku, Co., Ltd.) in 596 g of water was sprayed into the mixture under a nozzle pressure of 18 kg/cm$^2$. After reversal emulsification by the same method as the one of Example 1, an oil-in-water type emulsion having a total solids concentration of 35% by weight was prepared.

Example 4

To 252 g of an alkenylsuccinic acid, which had been prepared from a propylene oligomer (having an average of 15 carbon atoms) by the same method as the one of Example 1, was added 108 g of an oxidized wax (Polylets OX-24™, manufactured by Chusei Wax Polymer K.K.). The ingredients were heated to 120° C. and mixed together. Then the mixture was fed into a high-temperature high-pressure emulsifier and circulated. Subsequently, a solution of 75 g of the high-molecular weight dispersion stabilizer prepared in Referential Example 2 in 596 g of water was added in the same manner as the one described in Example 1. After reversal emulsification, an oil-in-water type emulsion having a total solids concentration of 35% by weight was prepared.

Comparative Example 1

To 100 g of an alkenylsuccinic anhydride, obtained from an addition reaction between a linear internal olefin (average carbon atom number: 16) and maleic anhydride, was added 5 g of polyoxyethylene (polymerization degree: 13) nonyl phenyl ether. The mixture was well stirred at 50° C. 1 g of this mixture was mixed with 99 g of water and emulsified by stirring in a homomixer at 10,000 rpm for 1 minute. Thus an oil-in-water type emulsion having a total solid concentration of 1% by weight was obtained.

Comparative Example 2

To 252 g of an alkenylsuccinic acid, prepared from a propylene oligomer (having an average of 15 carbon atoms) by the same method as the one of Example 1, was added 108 g of a commercially available paraffin wax (Dialene 30™, manufactured by Mitsubishi Chemical Industries, Ltd.). The mixture was heated to 120° C. and mixed together. Then the mixture was fed into a high-temperature high-pressure emulsifier and circulated. Subsequently, a solution of 75 g of the high-molecular weight dispersion stabilizer prepared in Referential Example 2 in 596 g of water was added in the same manner as the one described in Example 1. After reversal emulsification, an oil-in-water type emulsion having a total solid concentration of 35% by weight was prepared.

Comparative Example 3

To 180 g of an alkenylsuccinic acid, which had been prepared from a propylene oligomer (having an average of 15 carbon atoms) by the same method as the one of Example 1, was added 180 g of an oxidized wax (Polylets OX-24™, manufactured by Chusei Wax Polymer K.K.) and heated to 120° C. and mixed together. Then the mixture was fed into a high-temperature high-pressure emulsifier and circulated. Subsequently, a solution of 75 g of the high-molecular weight dispersion stabilizer prepared in Referential Example 2 in 596 g of water was added in the same manner as the one described in Example 1. After reversal emulsification, an oil-in-water type emulsion of a total solid concentration of 35% by weight was prepared.

Comparative Example 4

To 60 g of an alkenylsuccinic anhydride, which had been obtained by an addition reaction between a propylene oligomer (having an average of 12 carbon atoms) and maleic anhydride, was added an aqueous solution comprising 26 g of potassium hydroxide and 126 g of water. The mixture was stirred while maintaining at 90° to 100° C. Then it was cooled for 3 hours to thereby give a saponified alkenylsuccinic acid sizing agent having a total solid concentration of 35% by weight.

Comparative Example 5

A commercially available emulsion type rosin-series sizing agent (OT-500J™, manufactured by Dick Hercules K.K.) which had a solid concentration of 50% and was prepared by emulsifying a rosin-series resin comprising fumaric rosin as the main component was used with a high-molecular weight dispersion stabilizer.

Comparative Example 6

A commercially available saponified rosin-series sizing agent (PF Size 800L™, manufactured by Misawa Ceramic Chemical K.K.) which had a solid concentration of 50% and was prepared by saponifying a rosin-series resin comprising maleic rosin as the main component with the use of caustic potash was used.

Storage Stability Test 25 g portions of the alkenylsuccinic acid-series emulsion sizing agents prepared by the methods described in the above Examples 1 to 4, and a commercially available sizing agent of Comparative Example 5 and the alkenylsuccinic acid-series emulsion sizing agents prepared in Comparative Examples 1, 2 and 3 were each sampled in a 50 ml glass vial and allowed to stand at room temperature (25° C.). Then the stability of each sample was observed with the naked eye 1, 7 and 60 days thereafter. A sample with a poor stability underwent the separation of an oily matter on the bottom of the vial or in the upper part of the liquid. The products of Comparative Examples 4 and 6 were not subjected to storage stability test, since they were not emulsion type sizing agents but saponified ones.

Table 1 shows the results.

TABLE 1

Result of Storage Stability Test

| | Storage time (days) | | |
|---|---|---|---|
| | 1 | 7 | 60 |
| Ex. | | | |
| 1 | no precipitate | no precipitate | no precipitate |
| 2 | " | " | " |
| 3 | " | " | " |
| 4 | " | " | " |
| C. Ex. | | | |
| 1 | trace precipitate | much precipitate | much precipitate |
| 2 | no precipitate | no precipitate | trace precipitate |
| 3 | " | " | no precipitate |
| 4 | — | — | — |
| 5 | no precipitate | no precipitate | trace precipitate |
| 6 | — | — | — |

Sizing Effect Determination Test

A bleached kraft pulp was diluted with tap water to give a pulp concentration of 2.5% and then beaten with a beater to give a Canadian Standard Freeness of about 450 ml. Next, the pulp slurry thus obtained was diluted with tap water at 40° C. to give a 2.0% by weight slurry. Then aluminum sulfate (1.0% by weight based on the pulp) was added thereto under stirring. After diluting the slurry with water (pH 4.0, 40° C.) to give a concentration of 0.5% by weight, each of the sizing agents of Examples 1 to 4 and Comparative Examples 1 to 6 (0.3% by weight based on the pulp) were added. Each slurry was subjected to papermaking with a TAPPI standard machine (paper weight: 60 g/m2). The wet paper thus obtained was pressed in a conventional manner and then dried. The paper thus obtained was subjected to moisture conditioning for a day in a thermo-hygrostatic room (20° C., RH: 65%). Then the sizing effect was determined by the Stöckigt sizing degree determination method in accordance with JIS P 8122. For effecting a papermaking test in a higher pH value region, a small amount of a dilute aqueous solution of sodium hydroxide was added, after the addition of a definite amount of aluminum sulfate, to thereby regulate the slurry, the water for dilution and the papermaking water to pH 5.5. The papers thus produced were evaluated in the same manner as described in the previous example.

Table 2 shows the results.

TABLE 2

Results of Sizing Effect Determination Test

| | Stöckigt sizing degree (sec.) | |
|---|---|---|
| | pH 4.0 | pH 5.5 |
| Ex. | | |
| 1 | 17 | 28 |
| 2 | 19 | 28 |
| 3 | 19 | 28 |
| 4 | 17 | 29 |
| C. Ex. | | |
| 1 | 13 | 30 |
| 2 | 10 | 17 |
| 3 | 3 | 3 |
| 4 | 10 | 6 |
| 5 | 22 | 8 |
| 6 | 5 | 5 |

Compared with the conventional emulsion sizing agents of alkenylsuccinic anhydrides, the alkenylsuccinic acid-series emulsion sizing agent according to the present invention has a high storage stability at a high concentration and exhibits an excellent sizing effect immediately after the papermaking. Compared with the saponified alkenylsuccinic acid-series sizing agents, moreover, it exerts a stable sizing effect over a wide pH range even in high-temperature papermaking.

What is claimed is:

1. An alkenylsuccinic acid emulsion sizing agent having a solid concentration of at least 30% by weight, which comprises an active component comprising:

(1) from 70 to 95 parts by weight of an alkenylsuccinic acid obtained by reacting a branched internal olefin having 12 to 18 carbon atoms with maleic anhydride; and (2) from 5 to 30 parts by weight of an oxidized wax having a softening point of 100° C. or above and an acid value of from 10 to 40 mg KOH/g; and wherein said active component is dispersed in water using a high-molecular weight dispersion stabilizer or a mixed system of a high-molecular weight dispersion stabilizer with an emulsifier.

2. The alkenylsuccinic acid emulsion sizing agent as claimed in claim 1, wherein said high-molecular weight dispersion stabilizer is a partial or complete saponification product of a copolymer which comprises:

(A) from 5 to 95 parts by weight of one or more anionic unsaturated monomers selected from the group consisting of acrylic acid, methacrylic acid, maleic acid, maleic anhydride, itaconic acid and fumaric acid; and (B) from 5 to 95 parts by weight of one or more nonionic unsaturated monomers selected from the group consisting of acrylates and methacrylates.

* * * * *